F. A. JACOBS.
TANK TESTING APPARATUS.
APPLICATION FILED JUNE 11, 1921.
1,429,949.
Patented Sept. 26, 1922.
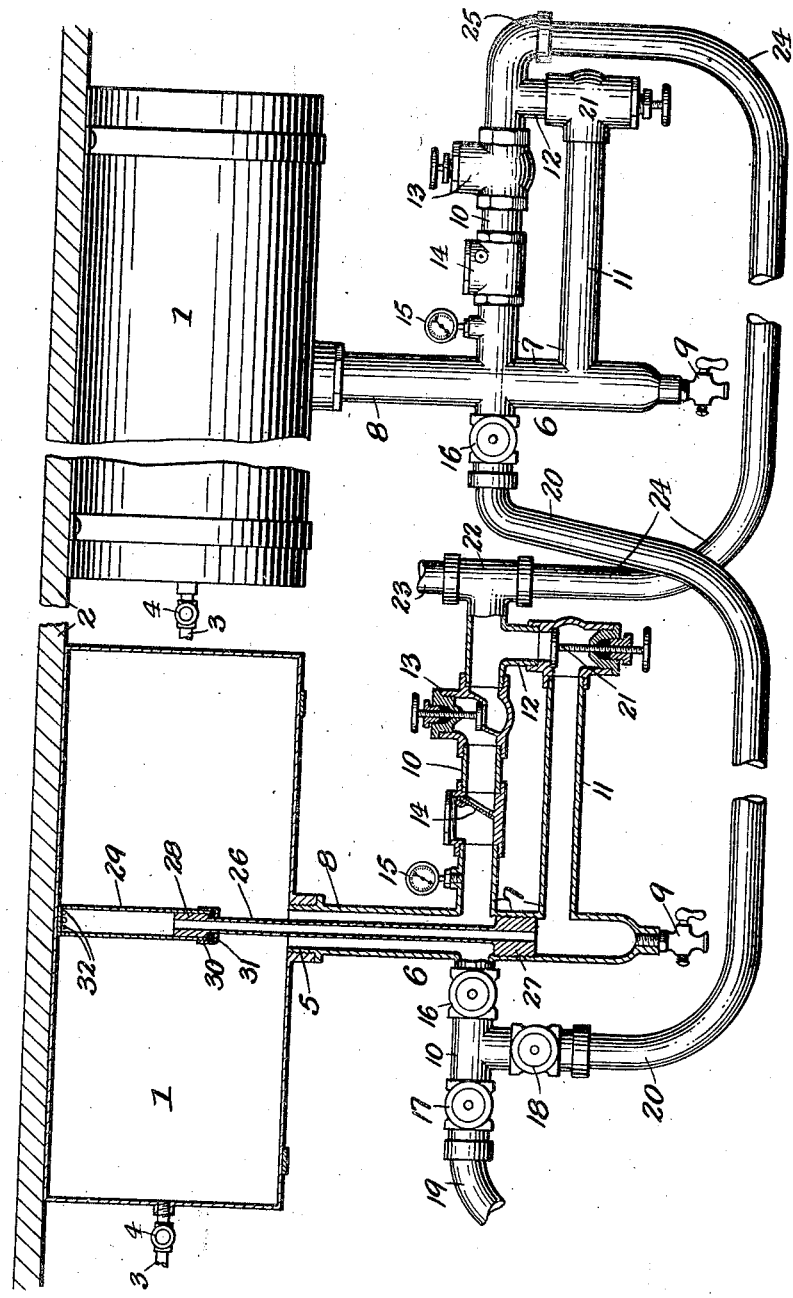
Inventor
Frederick A. Jacobs,
By his Attorneys Patented Sept. 26, 1922.

1,429,949

UNITED STATES PATENT OFFICE.

FREDERICK A. JACOBS, OF RICHMOND HILL, NEW YORK.

TANK-TESTING APPARATUS.

Application filed June 11, 1921. Serial No. 476,755.

*To all whom it may concern:*

Be it known that I, FREDERICK A. JACOBS, a citizen of the United States, and residing at Richmond Hill, Long Island, in the county of Queens and State of New York, have invented certain new and useful Improvements in Tank-Testing Apparatus, of which the following is a specification, such as will enable those skilled in the art to which it appertains to make and use the same.

This invention relates to testing apparatus designed for use in connection with tanks of various kinds and classes, and particularly gas tanks, and the object of the invention is to provide an apparatus of the class specified which may be composed of one or more units, and each of said units being adapted to be detachably connected with a tank to be tested and provided with means whereby the tank may be filled with water and with means for introducing compressed air into the apparatus to place the water in the tank under a predetermined pressure thus detecting any leak in said tank as will be apparent; and with this and other objects in view the invention consists in an apparatus of the class and for the purpose specified which is simple in construction and operation and efficient in use.

The invention is fully disclosed in the following specification, of which the accompanying drawing forms a part, in which the separate parts of my improvement are designated by suitable reference characters, said drawing being a diagrammatic side and sectional view of my improved apparatus and illustrating the method of its use.

My improved apparatus, as shown in the accompanying drawing, is designed principally for use in testing gas tanks 1 suspended from the framework of locomotives or cars, part of said framework being indicated at 2 in the drawing, and said tanks are provided with suitable supply and discharge pipes 3 controlled by valves 4, and the bottoms of said tanks are provided with threaded apertures 5 adapted to normally receive closure plugs which are not shown, and my improved testing apparatus or the separate units 6 thereof are adapted to be connected with, or mounted in the apertures 5 and suspended from the tanks 1 as shown.

In the accompanying drawing I have shown two testing apparatus or units which are coupled together in the manner shown and as hereinafter described whereby two tanks may be tested as hereinafter set out. The separate units 6 each involve a main tubular framework 7 consisting of vertical members 8, the upper ends of which are each connected with one of the tanks 1, as clearly shown, and the lower ends of which are closed and provided with pet cocks 9, and said framework 7 also involves two horizontal members 10 and 11, the members 10 extending at both sides of the vertical members 8, while the members 11 extend at one side only of said members, the ends thereof being coupled with the members 10 by means of the vertical portions 12.

A valve 13 and check valve 14 are mounted in each of the members 10 of the separate units at one side of the vertical members 8 as is also a pressure gage device 15, and mounted in the members 10 on the opposite sides of the vertical members 8 are other valves 16. The testing unit at the left of the drawing, or the free end of the member 10 thereof, is T-shaped in form and is provided with other valves 17 and 18 and a water supply tube 19 communicates with said member 10 through the valve 17, while another water pipe or tubing 20 communicates with the member 10 of said unit through the valve 18 and also communicates with the member 10 of the unit shown at the right of the drawing through the valve 16 of said unit.

Another valve 21 is mounted in connection with the members 11 and 12 of the separate units and is adapted to control the communication between the members 10 and 11, as will be apparent. The member 10 of the unit 6 shown at the left of the drawing is provided with a cross head 22 with one end of which is connected a pipe or tubing 23 which leads to a suitable air compressor or pump which is not shown in the drawing, and another pipe or tubing 24 is connected with the other end of said cross head and extends to and is coupled with a downwardly directed extension 25 on the other end of the member 10 of the testing unit shown at the right of the drawing.

A vent tube 26 is mounted in the vertical member 8 of each unit of the tubular frame 7 just below the members 10 of said units as shown at 27, and said tubes extend upwardly into the tanks 1, and are provided with enlarged heads 28 upon which thimble-shaped sleeves 29 are mounted, the lower ends of said sleeve being open and adapted to be closed by caps 30, and packing rings 31, and the upper ends of said sleeves are closed and the side walls of said sleeves are provided adjacent to said ends with a plurality of apertures 32. It will be seen that the vent tubes 26 and sleeves 29 form a communication between the tops of the tanks 1, and the bottoms of the members 8 of the frames 7 as well as the members 11 thereof.

It will be understood from the foregoing description that the separate units are of the same construction throughout, except that hereinbefore referred to, pertaining to the end structure of the members 10 of the said units, and it will also be understood that the members 8, 10, 11, 12, 22 and 25 which constitute the tubular frame or framework of the separate units may be formed by suitable castings, or composed of pipes and pipe couplings, if desired. The use of my improved testing apparatus as shown will be readily understood from the foregoing description when taken in connection with the accompanying drawing and the following statement.

After the gas in the tanks 1 is discharged the usual plugs mounted in the apertures 5 of said tanks are removed and my improved apparatus, as shown, is connected therewith and the valves 4 in the gas supply and discharge pipes 3 of said tanks are closed, the valves 13, 18 and 21 of the separate units are closed and the valves 9, 16 and 17 of the unit shown at the left of the drawing are opened and water from any suitable source passes into the member 10 and upwardly through the member 8 around the vent tube 26 and into the tank with which said unit is connected. The water continues to rise in said tank and, when it reaches the top thereof, passes through the apertures 32 in the sleeve 29 downwardly through the vent tube 26 and out through the pet cock 9. The pet cock 9 is then closed and the valve 17 also closed, after which the valve 13 is opened and air under pressure from a suitable compressor or air pump passes into the member 10 through the valves 13 and 14 to place water in the tank 1 under a predetermined pressure which will be indicated by the pressure gage 15, after which the valve 13 is again closed and the tank 1 is closely examined to determine, whether or not, there is any leakage and, if not, the valve 21 is opened and air under pressure passes downwardly through the compling 12 into the member 11 and upwardly through the vent tube into the top of the tank through the apertures 32, and in this operation the valve 18 is opened to allow the water forced out of the tank by the introduction of compressed air into the top thereof, to pass through the pipe or tubing 20 into the member 10 of the unit 6 shown at the right of the drawing, it being understood that in this operation the valves 13 and 21 of said unit are closed in order that the compressed air in the pipe or tubing 20 cannot pass into the members 10 or 11 of said unit.

The above described operation of introducing the water into the tank 1 with which said last named unit is connected and placing the water in said tank under pressure will be the same as that hereinbefore set out in reference to said first named unit, and after the test has been performed, the valve 16 of said last named unit will be opened and the valve 16 of the first named unit closed, and the valves 17 and 18 opened, and the passage of air into the tank of said last named unit to discharge the water therefrom will force said water out through the pipe or tubing 20 and thus out through the water supply pipe or tubing 19 into any suitable sort of discharge.

From the foregoing it will be apparent that two tanks may be tested by re-using the water with which one of the tanks is first filled and it will also be apparent that instead of discharging the water from the last tested tank through the pipe 19 to any sort of discharge, this water may pass into another pipe which would direct the water to another testing apparatus, or a plurality of such apparatus. It will also be apparent that after the test has been completed and all of the water discharged in the gas tanks, the testing apparatus will be removed and the apertures 5 of said tanks again closed with the usual plugs, and gas may again be passed into said tanks through the pipes 3 and valves 4 therein.

One of the distinctive advantages of my improved testing apparatus over other apparatus of this class is in the fact that the tanks to be tested are entirely filled with water and this water is placed under pressure, and unless the tanks to be tested are filled a successful test or accurate test cannot be performed, and while I have shown certain details of construction for carrying my invention into effect, it will be understood that I am not necessarily limited to these details, and changes therein and modifications thereof may be made, within the scope of the appended claims, without departing from the spirit of my invention or sacrificing its advantages.

It will also be apparent that I am by no means limited to the use of the plurality of testing units coupled together in the manner shown in the drawing, as a single testing unit may be employed and, in this event, the unit will be constructed in the manner shown in the unit located at the right of the drawing in which a single valve 16 may be employed to control the admission and discharge of water and a single air supply pipe will be employed.

Having fully described my invention, what I claim as new and desire to secure by Letters Patent, is:—

1. A tank testing apparatus comprising a suitable framework of tubular members, said framework being adapted to be mounted in connection with a tank and in communication therewith a discharge member at the bottom thereof, a vent tube being mounted in said framework and extending into said tank, means whereby water may be passed into and through certain of the members of said framework around said vent tube and into the tank to be tested and through said vent tube and out through said discharge member, and means whereby compressed air may be passed into said framework to place the water therein and in the tank to be tested under predetermined pressure.

2. A tank testing apparatus comprising a suitable framework of tubular members, said framework being adapted to be mounted in connection with a tank and in communication therewith a discharge member at the bottom thereof, a vent tube being mounted in said framework and extending into said tank, means whereby water may be passed into and through certain of the members of said framework around said vent tube and into the tank to be tested and through said vent tube and out through said discharge member, means whereby compressed air may be passed into said framework to place the water therein and in the tank to be tested under predetermined pressure, and a check valve for automatically retaining the water under pressure in the framework and said tank.

3. A tank testing apparatus comprising a suitable framework of tubular members, said framework being adapted to be mounted in connection with a tank and in communication therewith a discharge member at the bottom thereof, a vent tube being mounted in said framework and extending into said tank, means whereby water may be passed into and through certain of the members of said framework and around said vent tube and into the tank to be tested and through said vent tube and out through said discharge member, means whereby compressed air may be passed into said framework to place the water therein and in the tank to be tested under predetermined pressure, and means whereby the water in said tank and the framework may be discharged therefrom.

4. A tank testing apparatus comprising a suitable framework of tubular members, said framework being adapted to be mounted in connection with a tank and in communication therewith a discharge member at the bottom thereof, a vent tube being mounted in said framework and extending into said tank, means whereby water may be passed into and through certain of the members of said framework and around said vent tube and into the tank to be tested and through said vent tube and out through said discharge member, means whereby compressed air may be passed into said framework to place the water therein and in the tank to be tested under predetermined pressure, and means whereby air under pressure may be passed into said tank through said vent tube to discharge the water from said tank and framework.

5. A tank testing apparatus comprising a suitable framework of tubular members, said framework being adapted to be detachably mounted in connection with a tank to be tested and in communication therewith a discharge member at the bottom thereof, a vent tube being mounted in said framework and extending upwardly into the top portion of said tank, the top of said tube being provided with apertures forming a communication between the said tube and said tank, means involving valve devices whereby water may be passed into and through certain of the members of said framework around said vent tube and into the tank to be tested and downwardly through said vent tube and out through said discharge member, and means involving valve devices whereby air under pressure may be passed into said framework to place the water therein and in said tank under predetermined pressure.

6. A tank testing apparatus comprising a suitable framework of tubular members, said framework being adapted to be detachably mounted in connection with a tank to be tested and in communication therewith, a discharge member at the bottom thereof, a vent tube being mounted in said framework and extending upwardly into the top portion of said tank, the top of said tube being provided with apertures forming a communication between the said tube and said tank, means involving valve devices whereby water may be passed into and through certain of the members of said framework around said vent tube and into the tank to be tested and downwardly through said vent tube and out through said discharge member, means involving valve devices whereby air under pressure may be passed into said framework to place the water therein and in said tank under predetermined pressure, and means for indicating the pressure within said framework and said tank.

7. A tank testing apparatus comprising a suitable framework of tubular members, said framework being adapted to be detachably mounted in connection with a tank to be tested and in communication therewith, a discharge member at the bottom thereof, a vent tube being mounted in said framework and extending upwardly into the top portion of said tank, the top of said tube being provided with apertures forming a communication between the said tube and said tank, means involving valve devices whereby water may be passed into and through certain of the members of said framework around said vent tube and into the tank to be tested and downwardly through said vent tube and out through said discharge member, means involving valve devices whereby air under pressure may be passed into said framework to place the water therein and in said tank under predetermined pressure, means for indicating the pressure within said framework and said tank, and means whereby air under pressure may be passed upwardly through said vent tube into said tank to discharge water therefrom and from said framework.

8. A tank testing apparatus comprising a suitable framework of tubular members, said framework being adapted to be detachably mounted in connection with a tank to be tested and in communication therewith, a discharge member at the bottom thereof, a vent tube being mounted in said framework and extending upwardly into the top portion of said tank, the top of said tube being provided with apertures forming a communication between the said tube and said tank, means involving valve devices whereby water may be passed into and through certain of the members of said framework around said vent tube and into the tank to be tested and downwardly through said vent tube and out through said discharge member, means involving valve devices whereby air under pressure may be passed into said framework to place the water therein and in said tank under predetermined pressure, means for indicating the pressure within said framework and said tank, and means whereby air under pressure may be passed upwardly through said vent tube into said tank to discharge water therefrom and from said framework, said last named means being controlled by a valve device.

9. An apparatus for testing gas tanks and the like comprising two testing units, each of which is composed of a framework of tubular members, said framework being adapted to be detachably mounted in connection with a tank to be tested and provided with a vent tube mounted in said framework and extending upwardly into the top portion of the tank to be tested, means involving valve devices whereby water may be passed into the framework of one of said testing units and into the tank in connection with which it is mounted through said tank and downwardly through said vent tube and discharged at the bottom of said framework through a suitable discharge device, and means whereby air under pressure may be passed into said unit to place the water therein and in said tank under predetermined pressure.

10. An apparatus for testing gas tanks and the like comprising two testing units, each of which is composed of a framework of tubular members, said framework being adapted to be detachably mounted in connection with a tank to be tested and provided with a vent tube mounted in said framework and extending upwardly into the top portion of the tank to be tested, means involving valve devices whereby water may be passed into the framework of one of said testing units and into the tank in connection with which it is mounted through said tank and downwardly through said vent tube and discharged at the bottom of said framework through a suitable discharge device, means whereby air under pressure may be passed into said unit to place the water therein and in said tank under predetermined pressure, and means whereby the water in said first named unit and in the tank in connection with which the same is mounted may be passed into the framework of the other unit of the apparatus and the tank in connection with which the same is mounted.

11. An apparatus for testing gas tanks and the like comprising two testing units, each of which is composed of a framework of tubular members, said framework being adapted to be detachably mounted in connection with a tank to be tested and provided with a vent tube mounted in said framework and extending upwardly into the top portion of the tank to be tested, means involving valve devices whereby water may be passed into the framework of one of said testing units and into the tank in connection with which it is mounted through said tank and downwardly through said vent tube and discharged at the bottom of said framework through a suitable discharge device, means whereby air under pressure may be passed into said unit to place the water therein and in said tank under predetermined pressure, means whereby air under pressure may be forced upwardly into the tank in connection with which said first named unit is mounted to force the water from said tank and the framework of said unit, and means whereby the water discharged from said first named unit may be passed into the framework of the other unit of the apparatus and into the tank in connection with which said unit is mounted.

12. An apparatus for testing gas tanks and the like comprising two testing units, each of which is composed of a framework of tubular members, said framework being adapted to be detachably mounted in connection with a tank to be tested and provided with a vent tube mounted in said framework and extending upwardly into the top portion of the tank to be tested, means involving valve devices whereby water may be passed into the framework of one of said testing units and into the tank in connection with which it is mounted through said tank and downwardly through said vent tube and discharged at the bottom of said framework through a suitable discharge device, means whereby air under pressure may be passed into said unit to place the water therein and in said tank under predetermined pressure, means whereby air under pressure may be forced upwardly into the tank in connection with which said first named unit is mounted to force the water from said tank and the framework of said unit, means whereby the water discharged from said first named unit may be passed into the framework of the other unit of the apparatus and into the tank in connection with which said unit is mounted, and means whereby air under pressure may be passed into the framework of said last named unit to place the water therein under pressure and to discharge the water therefrom.

13. A testing apparatus of the class described comprising a tubular framework through which the testing fluid and air is adapted to pass, said framework being composed of a vertical member and two horizontal members in communication therewith, a valve mounted in one of said horizontal members for controlling the supply and discharge of water to said framework, other valves in said member for controlling the supply of air under pressure to said framework, a vent tube mounted in the vertical member of said framework and extending beyond the upper end thereof, and a discharge device at the lower end of the vertical member of said framework.

14. A testing apparatus of the class described comprising a tubular framework through which the testing fluid and air is adapted to pass, said framework being composed of a vertical member and two horizontal members in communication therewith, a valve mounted in one of said horizontal members for controlling the supply and discharge of water to said framework, other valves in said member for controlling the supply of air under pressure to said framework, a vent tube mounted in the vertical member of said framework and extending beyond the upper end thereof, a discharge device at the lower end of the vertical member of said framework, said horizontal members of the framework being placed in communication at their ends and a valve device for controlling said communication.

15. A testing apparatus of the class described comprising a tubular framework through which the testing fluid and air is adapted to pass, said framework being composed of a vertical member and two horizontal members in communication therewith, a valve mounted in one of said horizontal members for controlling the supply and discharge of water to said framework, other valves in said member for controlling the supply of air under pressure to said framework, a vent tube mounted in the vertical member of said framework and extending beyond the upper end thereof, a discharge device at the lower end of the vertical member of said framework, said horizontal members of the framework being placed in communication at their ends, a valve device for controlling said communication, and a sleeve member mounted on the outer end of said vent tube and provided at its free end with a plurality of apertures.

16. A testing apparatus of the class described comprising a tubular framework through which the testing fluid and air is adapted to pass, said framework being composed of a vertical member and two horizontal members in a communication therewith, a valve mounted in one of said horizontal members for controlling the supply and discharge of water to said framework, other valves in said member for controlling the supply of air under pressure to said framework, a vent tube mounted in the vertical member of said framework and extending beyond the upper end thereof, a discharge device at the lower end of the vertical member of said framework, said horizontal members of the framework being placed in communication at their ends, a valve device for controlling said communication, a sleeve member mounted on the outer end of said vent tube and provided at its free end with a plurality of apertures, and a gage device mounted in the first named horizontal member of the framework.

In testimony that I claim the foregoing as my invention I have signed my name in presence of the subscribing witnesses this 9th day of June 1921.

FREDERICK A. JACOBS.

Witnesses:
  C. E. MULREANY,
  H. E. THOMPSON.